US012615239B1

(12) United States Patent
Turabi

(10) Patent No.: US 12,615,239 B1
(45) Date of Patent: Apr. 28, 2026

(54) MULTI-TENANT NETWORK SERVICE ARCHITECTURE

(71) Applicant: GRAPHIANT, INC., Fremont, CA (US)

(72) Inventor: Mosaddaq Hussain Turabi, San Jose, CA (US)

(73) Assignee: GRAPHIANT, INC., Fremont, CA (US)

( * ) Notice: Subject to any disclaimer, the term of this patent is extended or adjusted under 35 U.S.C. 154(b) by 700 days.

(21) Appl. No.: 17/521,691

(22) Filed: Nov. 8, 2021

Related U.S. Application Data

(63) Continuation of application No. 17/409,704, filed on Aug. 23, 2021, now abandoned.

(60) Provisional application No. 63/069,579, filed on Aug. 24, 2020.

(51) Int. Cl.
| | |
|---|---|
| *H04L 9/40* | (2022.01) |
| *H04L 45/037* | (2022.01) |
| *H04L 45/741* | (2022.01) |
| *H04L 67/561* | (2022.01) |

(52) U.S. Cl.
CPC ........ *H04L 63/0428* (2013.01); *H04L 45/037* (2022.05); *H04L 45/741* (2013.01); *H04L 67/561* (2022.05)

(58) Field of Classification Search
CPC ... H04L 63/0428; H04L 67/561; H04L 45/02; H04L 45/741
See application file for complete search history.

(56) References Cited

U.S. PATENT DOCUMENTS

| | | | | |
|---|---|---|---|---|
| 11,153,276 | B1 * | 10/2021 | Keyerleber | ........... H04L 63/029 |
| 2007/0248091 | A1 * | 10/2007 | Khalid | ................ H04L 63/0272 |
| | | | | 370/392 |
| 2017/0324714 | A1 * | 11/2017 | Wainner | .............. H04L 63/0272 |
| 2018/0102919 | A1 * | 4/2018 | Hao | .......................... H04L 45/38 |
| 2018/0152317 | A1 * | 5/2018 | Chang | ..................... G06T 9/005 |
| 2020/0106706 | A1 * | 4/2020 | Mayya | ..................... H04L 12/66 |
| 2021/0044565 | A1 * | 2/2021 | Moreno | ............. H04L 63/0272 |
| 2021/0075767 | A1 * | 3/2021 | Jain | ................... H04W 36/0044 |
| 2021/0084010 | A1 * | 3/2021 | Alharbi | ................. H04L 63/104 |
| 2021/0099360 | A1 * | 4/2021 | Parsons | .............. H04L 63/0272 |
| 2021/0111998 | A1 * | 4/2021 | Saavedra | .............. H04L 63/166 |
| 2021/0112033 | A1 * | 4/2021 | Saavedra | ................ H04L 63/20 |
| 2021/0119859 | A1 * | 4/2021 | Radhakrishnan | ... H04L 41/0803 |
| 2021/0168125 | A1 * | 6/2021 | Vemulpali | ............. H04L 9/3236 |

(Continued)

*Primary Examiner* — Stephen T Gundry
(74) *Attorney, Agent, or Firm* — Maschoff Brennan

(57) ABSTRACT

Embodiments of a multi-tenant network service architecture are disclosed. For example, a method includes determining, based on a data packet to be communicated from a first enterprise node to a second enterprise node in an enterprise network, an encryption key associated with the second enterprise node, a first identifier to identify an egress core node in a core network, and a second identifier to determine a path leading to the second enterprise node. The method further includes encrypting the data packet using the encryption key and adding the first and second identifiers to the encrypted data packet. The method further includes forwarding the encrypted data packet until the encrypted data packet reaches the egress core node based at least on the first identifier, where the egress core node sends the encrypted data packet to the second enterprise node based at least on the second identifier.

16 Claims, 11 Drawing Sheets

(56)                    References Cited

U.S. PATENT DOCUMENTS

| | | | |
|---|---|---|---|
| 2021/0243011 A1* | 8/2021 | Amin | G06Q 20/385 |
| 2021/0288865 A1* | 9/2021 | Ruel | H04L 63/0272 |
| 2021/0288903 A1* | 9/2021 | Gupta | H04L 41/0895 |
| 2021/0344608 A1* | 11/2021 | Zeng | H04L 47/20 |
| 2021/0367920 A1* | 11/2021 | Devarajan | H04L 63/166 |
| 2022/0021610 A1* | 1/2022 | Kreger-Stickles | H04L 12/4641 |
| 2022/0060498 A1* | 2/2022 | Head, Jr | H04L 12/4641 |
| 2022/0131898 A1* | 4/2022 | Hooda | H04L 47/746 |
| 2022/0360566 A1* | 11/2022 | Sawant | H04L 63/061 |
| 2023/0103468 A1* | 4/2023 | Moore | H04L 61/4511 |
| | | | 726/1 |
| 2023/0224246 A1* | 7/2023 | Saavedra | H04L 45/125 |
| | | | 370/389 |
| 2023/0308391 A1* | 9/2023 | Jain | H04L 12/4633 |
| 2023/0308421 A1* | 9/2023 | Mayya | H04L 49/35 |

* cited by examiner

LFIB on C3 310

| Incoming Label | Outgoing Label | Outgoing Interface (nHOP) |
|---|---|---|
| L3 | None | Local |
| L2 | PoP | C2 |
| L1 | L1 | C2 |

LFIB on C2 308

| Incoming Label | Outgoing Label | Outgoing Interface (nHOP) |
|---|---|---|
| L3 | PoP | C3 |
| L2 | None | Local |
| L1 | PoP | C1 |

LFIB on C1 306

| Incoming Label | Outgoing Label | Outgoing Interface (nHOP) |
|---|---|---|
| L3 | L3 | C2 |
| L2 | PoP | C2 |
| L1 | None | Local |

Service Provider Core Network 102

C1 208    L1    302    C2 210    L2    304    C3 212    L3

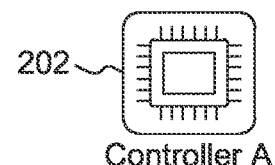
202 Controller A
102
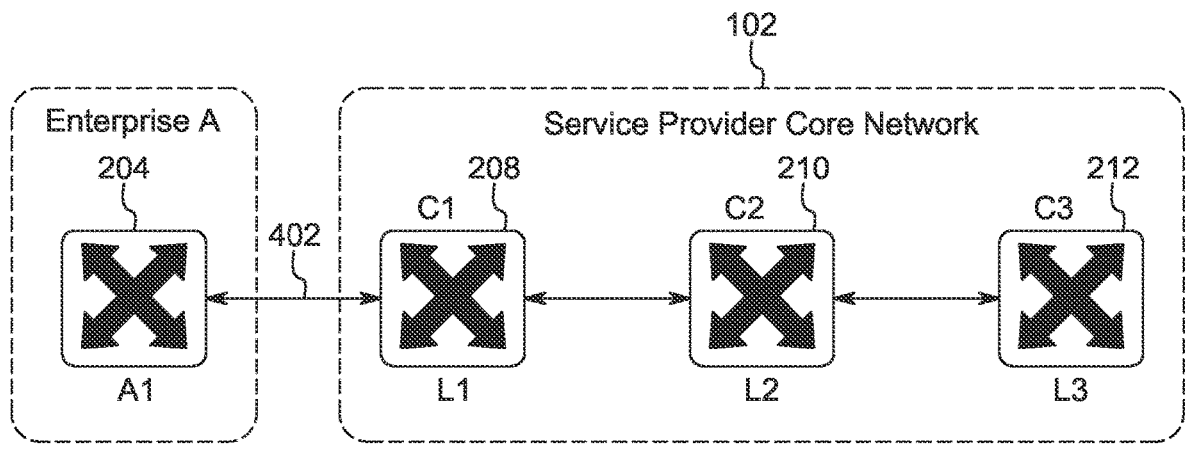
FIG. 4

1100

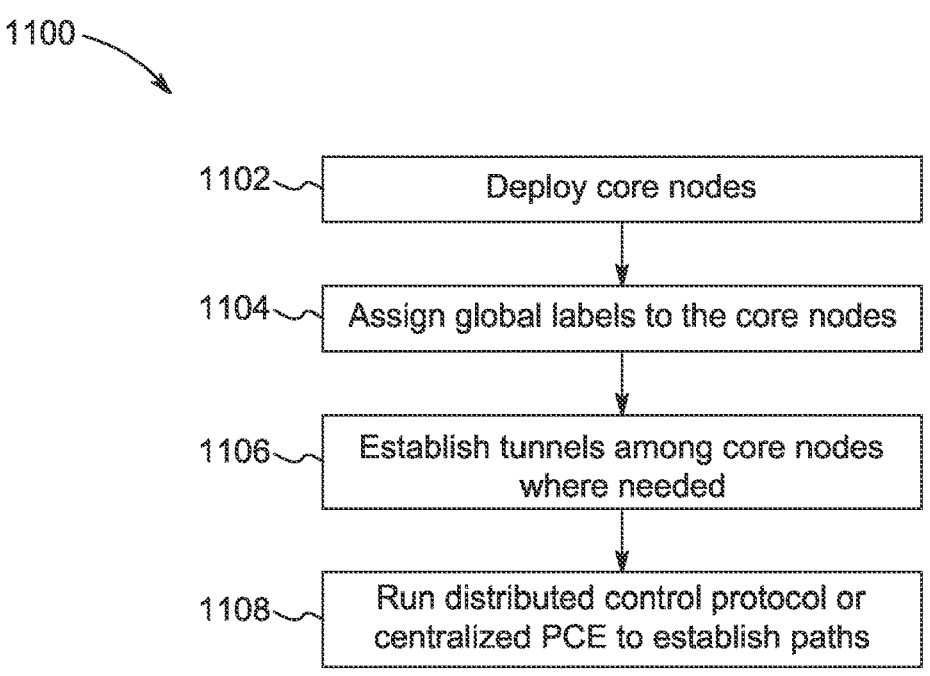

1102 ~ Deploy core nodes

1104 ~ Assign global labels to the core nodes

1106 ~ Establish tunnels among core nodes where needed

1108 ~ Run distributed control protocol or centralized PCE to establish paths

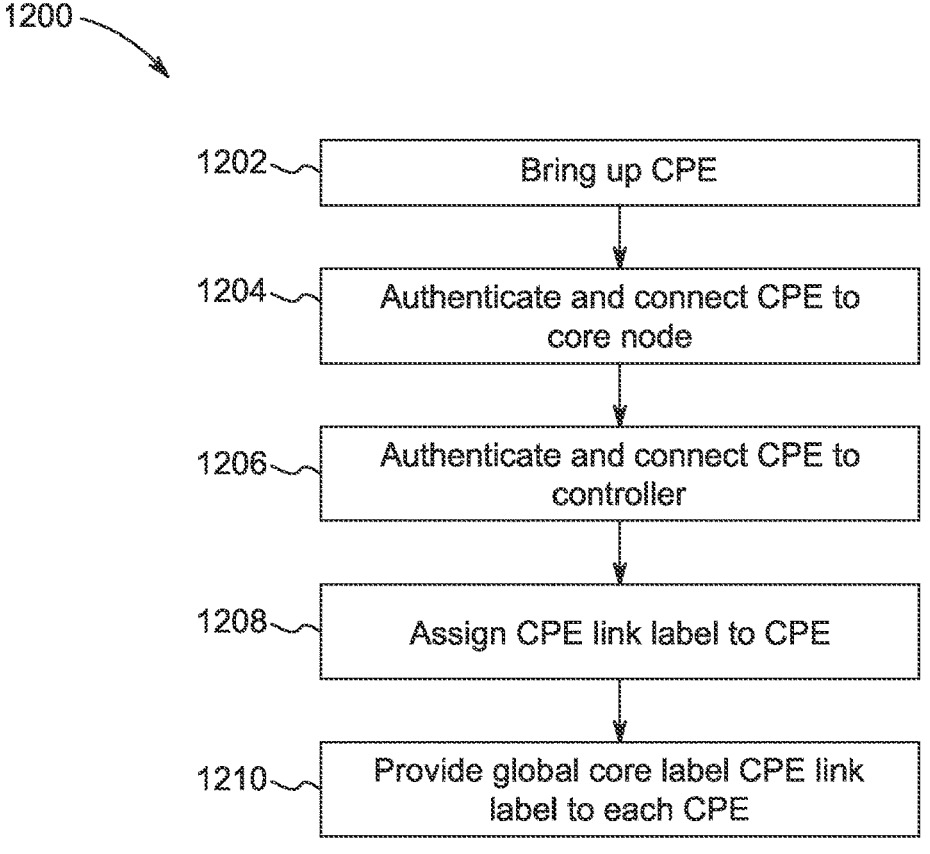

1202 ~ Bring up CPE

1204 ~ Authenticate and connect CPE to core node

1206 ~ Authenticate and connect CPE to controller

1208 ~ Assign CPE link label to CPE

1210 ~ Provide global core label CPE link label to each CPE

FIG. 12

MULTI-TENANT NETWORK SERVICE ARCHITECTURE

CROSS REFERENCE TO RELATED APPLICATION

This application is a continuation of U.S. Non-Provisional patent application Ser. No. 17/409,704, titled "MULTI-TENANT NETWORK SERVICE ARCHITECTURE", filed on Aug. 23, 2021, which claims the benefit of U.S. Provisional Patent Application Ser. No. 63/069,579, titled "MULTI-TENANT NETWORK SERVICE ARCHITEC-TURE", filed on Aug. 24, 2020, which is assigned to the assignee hereof and hereby, expressly incorporated by reference herein.

FIELD OF THE INVENTION

The embodiments discussed in the present disclosure are generally related to Service Providers (SPs). In particular, the embodiments discussed are related to methods, systems, and network service architectures for SPs.

BACKGROUND OF THE INVENTION

Numerous service providers (SPs) offer a host of connectivity and security services to enterprises/customers to help them deploy their respective networks. Customers get the benefit of not having to deal with core transport services because the core routing infrastructure is owned/managed by the SP. The core routing infrastructure is typically shared across multiple enterprise customers. The SP maintains segmentation across the multiple enterprise customers using Virtual Routing and Forwarding (VRF) on a per customer basis. One of the most common service provided by the SPs is, for example, Multiprotocol Label Switching (MPLS) Virtual Private Network (VPN) service. Existing approaches require the SP to learn and maintain customer routing information utilizing some form of a multi-tenant controller.

However, in such approaches, there may be scaling challenges as the routing table increases in size with increasing number of customers. The customer routing and data-plane scale requirements on core/Provider Edge (PE) nodes increase with increasing number of customers. Typically, a PE node terminates the multiple enterprise customers and maintains all the routing and forwarding state for the customer prefixes which may be undesirable in certain scenarios. In addition, customer application data may be exposed to the core/PE nodes which, in many cases, may violate enterprise compliance to data security norms. In some cases, access circuits may be encrypted (e.g., Internet Protocol Security (IPSec)) and the corresponding traffic may be decrypted at a first core/PE node, to make the routing decision, which may be a threat to customer's privacy and confidentiality.

SUMMARY OF THE INVENTION

Embodiments of a multi-tenant network service architecture are disclosed that address at least some of the above-mentioned challenges and issues.

In accordance with the embodiments of this disclosure, a method is disclosed. The method includes establishing and authenticating a control connection between a first enterprise node at a first site of an enterprise network and a controller. The method further includes receiving, from the controller, at least a first identifier and a second identifier associated with a second enterprise node at a second site of the enterprise network via the control connection, where the first identifier enables routing of one or more data packets within a core network and the second identifier identifies the second enterprise node on a given core node in the core network. The method further includes encapsulating the one or more data packets by the first enterprise node at the first site to communicate to the second enterprise node at the second site via at least one core node in the core network, based on at least the first and second identifiers associated with the second enterprise node.

In accordance with the embodiments of this disclosure, another method is disclosed. The method includes generating first encryption data/key to encrypt data packets by a first enterprise node of an enterprise network. The method further includes transmitting the first encryption data/key and one or more identifiers associated with the first enterprise node to a controller via a control connection established between the first enterprise node and the controller, where the one or more identifiers comprise routing information to route the data packets to a destination node via at least one core node in a core network. The method further includes receiving, by the first enterprise node, second encryption data/key and one or more identifiers associated with a second enterprise node of the enterprise network from the controller. This establishes the encryption and decryption keys at the first and second enterprise nodes. The method further includes updating a routing table of the first enterprise node based on the second encryption key and the one or more identifiers associated with the second enterprise node. The method further includes routing a data packet from the first enterprise node to the second enterprise node via the at least one core node based on the updated routing table.

In accordance with the embodiments of this disclosure, yet another method is disclosed. The method includes determining, based on a data packet to be communicated from a first enterprise node to a second enterprise node in an enterprise network, an encryption key associated with the second enterprise node, a first identifier to identify an egress core node in a core network, and a second identifier to determine a path leading to the second enterprise node. The method further includes encrypting the data packet by the first enterprise node using the determined encryption key, and adding the determined first identifier and second identifier by the first enterprise node to the encrypted data packet. The method further includes forwarding the encrypted data packet by the first enterprise node with the added first and second identifiers to an ingress core node in the core network. The ingress core node forwards the encrypted data packet to a subsequent core node until the encrypted data packet reaches the egress core node based at least on the first identifier. The egress core node further sends the encrypted data packet to the second enterprise node based at least on the second identifier.

BRIEF DESCRIPTION OF THE DRAWINGS

Further advantages of the invention will become apparent by reference to the detailed description of preferred embodiments when considered in conjunction with the drawings:

FIG. 4 illustrates an onboarding process of an enterprise customer's first site for a unicast scenario in the topology of FIG. 2 in accordance with an embodiment.

FIG. 11 illustrates a flowchart of an example method of deploying and setting up core nodes in accordance with an embodiment.

FIG. 12 illustrates a flowchart of an example method of setting up CPEs in accordance with an embodiment.

DETAILED DESCRIPTION

Figure 1:
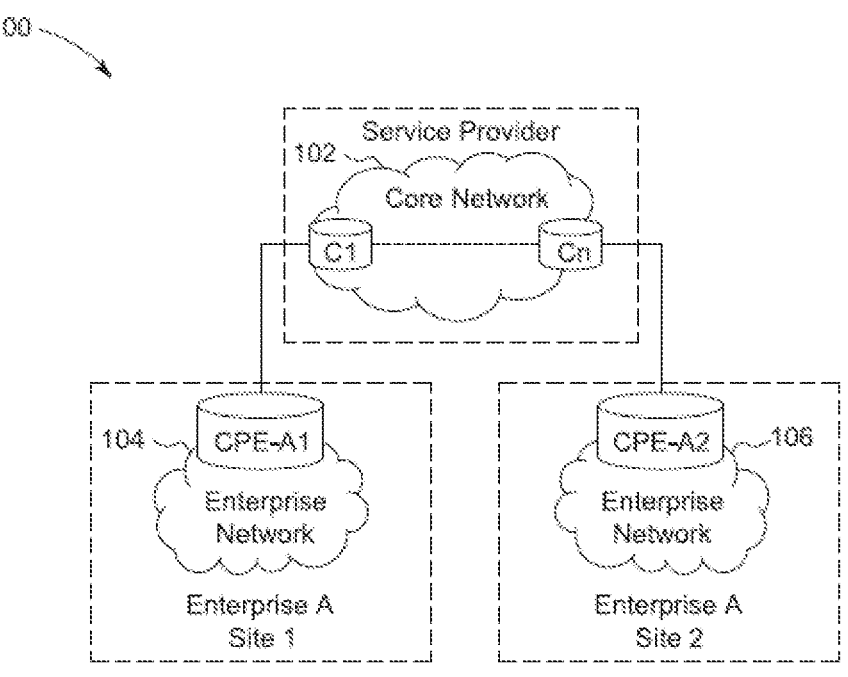
FIG. 1 illustrates an operating environment in which a multi-tenant network service architecture may be implemented, according to an example embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

A service provider (SP) typically operates and provides a core network over which data or traffic is routed to and/or from one or more enterprise customers. The disclosed architecture provides a method for the SPs to provide connectivity services to the one or more enterprise customers over their shared core infrastructure. This may be achieved by deploying multi-tenant controller(s) with segmentation or deploying dedicated single-tenant controllers per tenant. Customer specific routing information is not present on the core/PE nodes. Within the context of the disclosure, the core network enables routing of unicast traffic through one or more paths. A path may include a number of hops, where each hop identifies a link between adjacent nodes in the core network.

The core network may include but is not limited to segment routed Multiprotocol Label Switching (MPLS) network, Internet Protocol (IP) version 6 (IPv6) segment routed network, IP version 4 (IPv4) segment routed network, and Path Computation Element (PCE) based segment routed network. Further, the SPs in the present disclosure may include but are not limited to Secure Access Service Edge (SASE) providers, Network as a Service (NaaS) providers, Internet Service Provider (ISP), Managed Service Provider (MSP), MPLS VPN providers, and Software Defined Wide Area Network (SD-WAN) providers.

The disclosed solution/architecture provides a mechanism where the application data traffic is routed through SP backbone with no customer specific routing information and without exposing the actual IP packets in the core. As a result, segmentation and confidentiality are maintained not only across different enterprise customers, but also between the customer and the SP infrastructure. The disclosed solution/architecture results in a stateless, secured, and highly scalable SP core; and provides the ability to achieve the above-mentioned objectives for the unicast services.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish communication paths and route data/traffic via the established communication paths.

A "service provider" may refer to an entity providing, managing, and/or operating a core network.

A "core network" may refer to a network infrastructure that may connect one or more enterprise networks with each other. The core network represents a central or core element that provides paths for exchange of information between different networks. Therefore, the core network may be interchangeably referred herein as the "service provider network", "service provider core network/SP core network", "service provider core/SP core", or "backbone" without departing from the scope of the ongoing description.

An "enterprise network" may refer to a network owned and/or managed by customers, which may include one or more business entities requiring network infrastructure (such as a core network) to provide connectivity among users, devices, and applications that are local to the enterprise.

A "unicast" data transmission refers to one-to-one transmission from one point to another point in a network.

A "data packet" refers to data or information that is transmitted over a network. The data packet may include a metadata portion and a payload portion. The metadata portion may include one or more headers and the payload portion may include data (e.g., customer related data). Such data included in the payload portion may be sensitive and/or confidential and may need to be protected from any attack or impersonation by external or suspicious parties. Here, the data packet in its entirety, that is, including the metadata and payload portions, may also be referred to as a "data packet". In other words, the original data packet refers to a data packet originated by an endpoint device. The data packet may be a unicast data packet depending on the unicast data transmission. The data packet may be encrypted and/or encapsulated to enhance security in the data packet. The data packet may include one or more identifiers to enable routing of the data packet from one point to another point in a network.

For example, a high-level representation of encapsulation for a data packet is shown below:

TABLE A

| Outer IP Tunnel Encapsulation | |
| --- | --- |
| First identifier | |
| Second identifier | Metadata |
| Original Data Packet | |

As seen in Table A above, first and second identifiers are added as metadata to the original data (IP) packet and such a data packet is encapsulated using outer IP tunnel encapsulation, as an example. One may recognize that any encapsulation technique may be utilized such as but not limited to tunnel or non-tunnel modes of encapsulation. Table A is applicable to unicast scenarios. The specific embodiments of first and second identifiers are explained later in the description with respect to unicast scenarios.

Further, the terms "data" or "traffic" are interchangeably used in this disclosure and refer to any type of information, such as but not limited to messages, voice, video, media, or any other information in any appropriate format that may be communicated from one point to another.

An "endpoint device" may be any device associated with customers, individuals, or end users. The endpoint device may be a device from where the data packet originates for transmission or a device that receives the data packet after transmission as an intended destination. The endpoint device may be connected to any customer premises equipment (CPE) and accordingly, the endpoint device may be a source node and/or a destination node to transmit and/or receive data packets from the CPEs via the core network. The endpoint device may include but is not limited to a device such as a computer, a personal digital assistant (PDA), a laptop, a cellular telephone, a tablet, or any other device or network element capable of initiating or exchanging data within one or more communication networks.

"Cx" refers to core nodes (e.g., C1, C2, C3) in the core network. A "core node" may refer to any node capable of routing data within the core network such as, but not limited to an access point, a router, a bridge, a server, a gateway, a switch, a modem, a relay, or a hub.

Any core node may be an ingress core node/PE which handles incoming traffic from another network, or an egress core node/PE which handles outgoing traffic to another network.

A CPE may include any device that is located within the premises of a customer's enterprise network. An ingress CPE may receive data packets originated from an endpoint device and perform encryption/encapsulation on the received data packets to create encrypted/encapsulated data packet(s). The ingress CPE may send the encrypted/encapsulated data packet(s) towards the core nodes. An egress CPE may receive the encrypted/encapsulated data packet(s) from the core nodes, decrypt/decapsulate the encrypted/encapsulated data packets, and transmit the plain data packets to an intended destination node/endpoint device.

"Ax" refers to CPEs of customer enterprise A. For example, A1, A2, and A3 refer to CPEs for a customer enterprise A. Similarly, "Bx" refers to CPEs of customer enterprise B.

"Controller X" refers to a controller for controlling and managing communication among network entities in a network. The controller X may be a dedicated controller for a particular enterprise (e.g., controller A for enterprise A, controller B for enterprise B etc.). For instance, controller X may be a centralized managing node that may be owned and operated by enterprise A to manage communication between enterprise nodes or CPEs owned and operated by enterprise A. Alternatively, controller X may be a multi-tenant controller for multiple tenants, customers, or enterprises. The multi-tenant controller may include logical segmentation for different customers and thus, segmentation may be maintained across different customers.

"Lx" refers to a unique identifier or a global label assigned to each core node in the core network. The global label assigned to each core node has a global meaning i.e., it is recognized or understood by each core node within the core network. Accordingly, the global label enables routing of data packets within the core network when added to the data packets. Lx or global label may be referred to as a first identifier for unicast data transmission. Accordingly, with respect to Table A shown previously, the first identifier may refer to the global label in an encapsulated data packet for the unicast data transmission.

"LAx" refers to a link label (e.g., LA1, LA2) assigned to different CPEs of enterprise networks. The CPE link label (CLL) assigned to each CPE has a local significance to the core nodes. Accordingly, CLL identifies a specific CPE on a given core node in the core network when added to the data packets. In other words, when CLL is added to any data packet, a path to the egress CPE is determined via the same core node by performing a label lookup for the added CLL. LAx or CLL may be referred to as a second identifier for unicast data transmission. Accordingly, with respect to Table A shown previously, the second identifier may refer to the CPE link label in the encapsulated data packet for the unicast data transmission.

"LFIB" refers to Label Forwarding Information Base which is a data structure or a database populated for each core node in the core network. LFIB includes a mapping between an incoming label, outgoing label, and an outgoing interface for forwarding data packets.

Although the identifiers (Lx, LAx) defined above are represented as MPLS labels for illustration throughout the disclosure, but without deviating from the scope of ongoing disclosure, the identifiers can be MPLS Labels, IPv4/IPv6 addresses, or a combination thereof.

The various embodiments throughout the disclosure will be explained in more detail with reference to figures.

FIG. 1 illustrates an operating environment 100 in which a multi-tenant network service architecture may be implemented, according to an example embodiment. The operating environment 100 includes a core network 102 operated by a service provider, an enterprise network 104 operated/managed by customer enterprise A and located at site 1, and an enterprise network 106 operated/managed by customer enterprise A and located at site 2. A customer may also be referred to as a "tenant" or any party who avails the services of the core network 102 or accesses the core network 102 to transmit/receive data.

The core network 102 may represent a network owned, managed, and/or operated by the service provider to provide connectivity services to one or more customers, such as customer enterprise A depicted in FIG. 1. The core network 102 includes one or more core nodes, generally referred to as core nodes. The core nodes may include nodes C1 to Cn, as depicted in FIG. 1. Although two core nodes are depicted in FIG. 1, however any number of core nodes may be included in the core network 102 without departing from the scope of the ongoing description. In an embodiment, the core network 102 is a label switched network and enables establishment of full mesh of label switched paths between the core nodes to route traffic. Further, without any limitation, the core network 102 may be a segment routed MPLS network, an IPv4/IPv6 segment routed network, or PCE based segment routed network.

In an embodiment, for unicast, a CPE learns regarding global labels for attached core nodes and (core assigned) link labels for the CPEs. This information is exchanged along with encryption data/key and routing information among the CPEs through "off-path" controller dedicated to the enterprise. Furthermore, security associations for customer encrypted traffic are established between the CPEs. Additionally, the user traffic and customer routing information are not visible to the core nodes, which is an advantage over the existing architectures.

The core network 102 may communicate with the enterprise network 104 through at least one enterprise node, such as CPE-A1, at site 1 of enterprise A. Further, the core network 102 may communicate with the enterprise network 106 through at least one enterprise node, such as CPE-A2, at site 2 of enterprise A. In an embodiment, the core network 102 may facilitate routing of data between remote locations, such as site 1 and site 2 of enterprise A. It will be apparent to a person with ordinary skill in the art that an enterprise may be present at multiple locations and for the sake of brevity, FIG. 1 exhibits a non-limiting example of two (remote) sites of enterprise A. Other configurations and scenarios are also possible where information can be exchanged between multiple sites of the enterprise A irrespective of whether the sites are remote or not.

In an embodiment, a PE node, such as but not limited to ingress or egress core node, may act as an interface or entry point for customer data between an enterprise network and the SP core. The customer data or packets may typically enter the core network 102 through the PE node, traverse the core network 102 through one or more intermediate nodes, and exit the core network 102 through another PE node.

In an embodiment, the core network 102 may be owned, managed, and/or operated by a large enterprise that is spread across multiple locations. The function of the core network 102 may include facilitating high-capacity communication between different business units at different geographical locations. In such a scenario, Information Technology (IT) department of an enterprise, for example, may act as a service provider for all the different business units and entities within the enterprise. In another embodiment, the core network 102 may be owned, managed, and/or operated by a service provider to enable sharing of their core infrastructure across multiple enterprise customers.

In an embodiment, the core network 102 may be a part of an MPLS network, a wide area network (WAN), such as but not limited to a software-defined WAN (SD-WAN), and networks provided by ISPs, MSPs, NaaS providers, and SASE providers. Further, the core network 102 may interface with multiple networks such as but not limited to the Internet and a wireless network, e.g., a Long-Term Evolution (LTE) network.

Enterprise networks 104 and 106 may represent first and second enterprise networks of enterprise A at sites 1 and 2, respectively. Enterprise networks 104 and 106 may be collectively referred to as an "enterprise network" for the sake of brevity in the disclosure and the usage of "enterprise network" in the disclosure may refer to either enterprise network 104 or 106. Various such enterprise networks located at different sites may need to be connected to each other via the core network 102 for external communication.

Therefore, the enterprise network may include one or more internal networks that are located at geographically distinct sites.

In an embodiment, the enterprise network may be a local area network (LAN), a WAN, or a private network based on operational requirements of the enterprise A. In an embodiment, enterprise A may be a customer of the service provider providing the core network 102. In an embodiment, enterprise A may be an enterprise managing the core network 102 and acting as a service provider.

Further, each of the enterprise networks 104 and 106 may be associated with a respective CPE, as depicted in FIG. 1, to access the core network 102. For example, the enterprise network 104 is associated with CPE-A1 and the enterprise network 106 is associated with CPE-A2. In an embodiment, each CPE may include but is not limited to a gateway, a switch, a router, a set-top box, a receiver, a computer, a cell phone, a smart phone, a tablet, a personal digital assistant (PDA), and so on.

Figure 2:
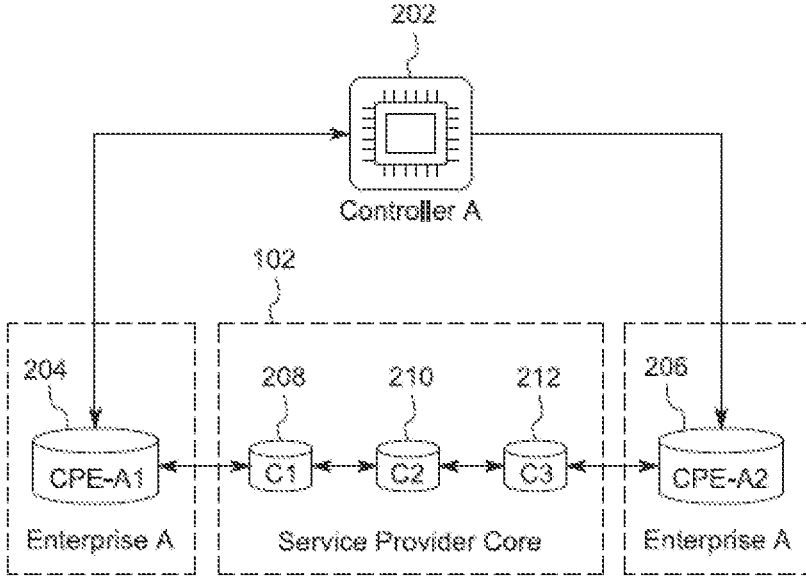
FIG. 2 illustrates an example network topology for a network service provider according to an embodiment.

FIG. 2 illustrates an example network topology for a network service provider according to an embodiment. FIG. 2 will be explained in conjunction with FIG. 1. As depicted in FIG. 2, the network topology includes a controller 202 (e.g., controller A), one or more enterprise nodes or CPEs (e.g., CPE-A1 204 and CPE-A2 206), and one or more service provider core nodes (e.g., C1 208, C2 210, and C3 212) in the SP core 102. In an embodiment, the SP core 102 may include a controller, a centralized PCE, or use some dynamic protocol to establish label switched paths.

In an embodiment, SP core 102 may be implemented as a plain label switched network of nodes. In an embodiment, the SP core may not have any customer specific control plane information and may not have visibility into customer traffic encrypted by the CPEs. Service providers (e.g., SASE, MPLS VPN, NaaS, and SD-WAN providers) usually own, manage, and/or operate a multi-tenant shared infrastructure.

In an embodiment, a data packet may refer to an IP packet which is to be routed from a source node to a destination node through first enterprise node (CPE-A1 204), ingress core node (C1 208), intermediate core node (C2 210), egress core node (C3 212), and second enterprise node (CPE-A2 206).

Specifically, with reference to FIG. 2, the IP packet originated at the source node, such as an endpoint device, is received by the first enterprise node CPE-A1 204. Then, CPE-A 1 204 may perform encryption/encapsulation to generate an encapsulated/encrypted IP packet and transmit the encapsulated/encrypted IP packet to the ingress core node C1 208. Subsequently, C1 208 may forward the encapsulated/encrypted IP packet to the intermediate core node C2 210, which may further forward the encapsulated/encrypted IP packet to the egress core node C3 212. Then, C3 212 may subsequently transmit the encapsulated/encrypted IP packet to the second enterprise node CPE-A2 206. Further, CPE-A2 206 may decapsulate/decrypt the encapsulated/encrypted IP packet and route the decapsulated/decrypted IP packet to the destination node, such as an endpoint device which is communicatively coupled to CPE-A2 206.

Although the data packet is shown to be routed via the ingress core node C1 208, intermediate core node C2 210, and egress core node C3 212 in FIG. 2, one may readily ascertain that instead of multiple core nodes in the SP core 102, there may be just one core node that is connected to CPE-A1 204 and CPE-A2 206. It will be apparent to a person with ordinary skill in the art that the embodiments explained with multiple core nodes throughout the disclosure can be analogously applied to scenarios having a single core node without undue experimentation.

In an embodiment, the controller A 202 may be a dedicated controller for a customer, such as enterprise A, to facilitate communication between the CPEs during the routing of the data packets between CPE-A1 204 and CPE-A2 206 at different enterprise sites 1 and 2, respectively. The controller A 202 is coupled to sub-networks of the enterprise network, i.e., enterprise networks 204 and 206. The controller A 202 may, for instance, facilitate control plane functions associated with the enterprise networks 204 and 206. Based on the control plane functions, the controller A 202 may also facilitate establishment of a data plane that connects the enterprise networks 204 and 206 for communication of the data packets between these enterprise networks. Additionally, the controller A 202 may also facilitate configuration of the respective CPEs (CPE-A1 204 and CPE-A2 206) of these enterprise networks, for communication over the data plane. In some embodiments, the controller A 202 may facilitate exchange of information, such as routing information, encryption related data, etc., between CPE-A1 204 and CPE-A2 206.

Figure 3:
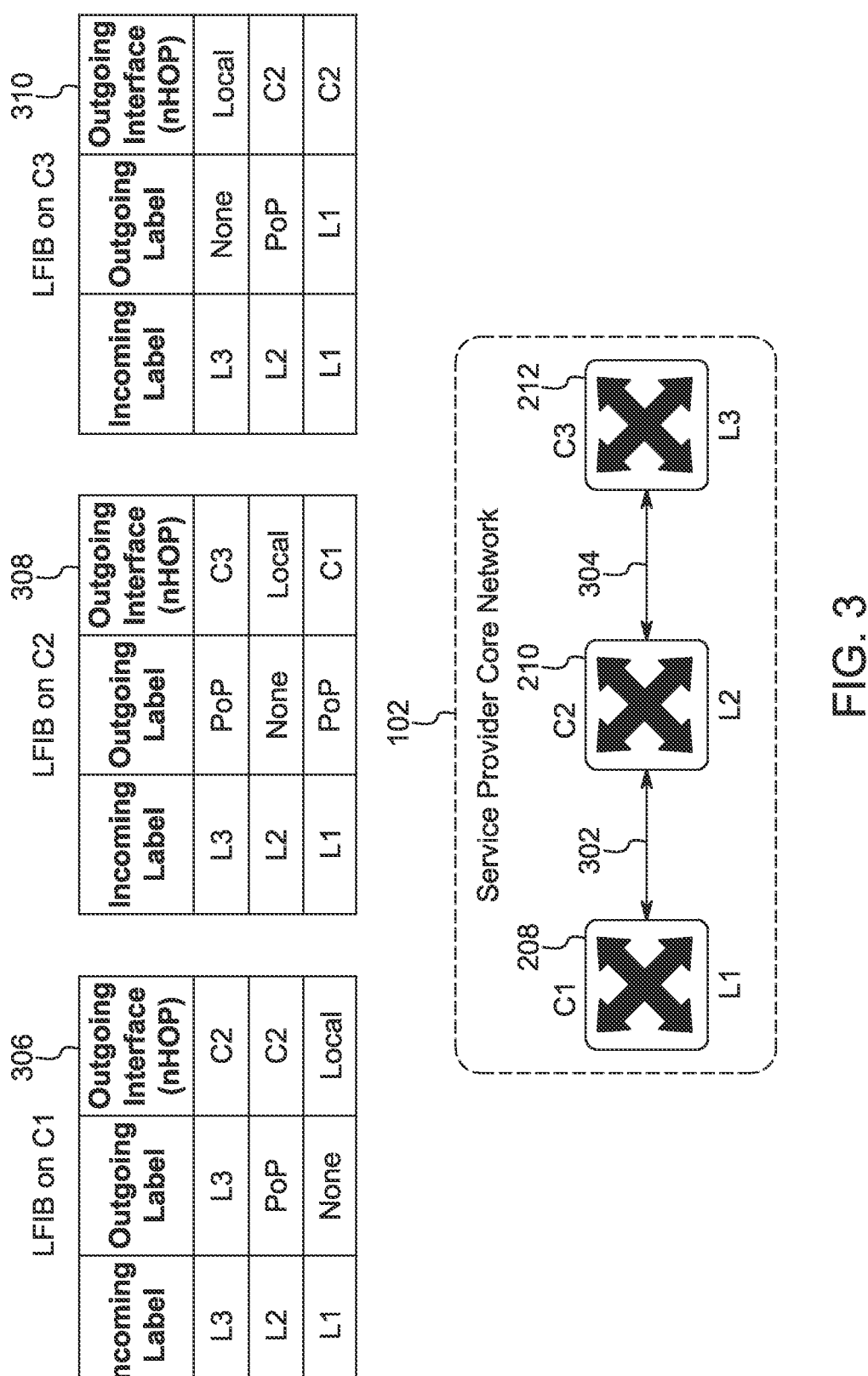
FIG. 3 illustrates an example core for the topology of FIG. 2 in accordance with an embodiment.

FIG. 3 illustrates an example core for the network topology of FIG. 2 in accordance with an embodiment. In an embodiment, the SP core network 102 may include a segment routed MPLS label switched network using Label Forwarding Information Base (LFIB). In another embodiment, the SP core network 102 may include an IPv6 segment routed core with Interior Gateway Protocol (IGP). In yet another embodiment, the SP core network 102 may include a PCE based segment routed network.

In the illustrated non-limiting example of FIG. 3, the SP core network 102 is implemented as a segment routed MPLS label switched network. In the SP core network 102, for example, three core nodes are deployed namely C1 208, C2 210 and C3 212. A communication link 302 is established between the core nodes C1 208 and C2 210, and a communication link 304 is established between the core nodes C2 210 and C3 212. Each core node, i.e., C1 208, C2 210, and C3 212, is assigned a global label of L1, L2, and L3, respectively. The global label of each core node is a "first identifier" that uniquely identifies a core node within the SP core network 102. It will be apparent to a person with ordinary skill in the art that the "first identifier" may include any label, identifier, or address such as but not limited to IPv4 or IPv6 loopback/forwarding addresses on the core nodes based on a configuration of the SP core network 102 without departing from the scope of the ongoing disclosure.

In an embodiment, the assignment of labels in the segment routed MPLS label switched network may be achieved by utilizing a dynamic protocol that is executed between the core nodes or by utilizing a centralized controller (e.g., PCE). As depicted in FIG. 3, each core node is associated with an LFIB, for example, LFIB 306 for C1 208, LFIB 308 for C2 210, and LFIB 310 for C3 212. Each LFIB for the core node may include details of an incoming label, an outgoing label, and an outgoing interface. Once the LFIBs are populated for all the core nodes as shown, a data packet can be transmitted from any core node to any other core node utilizing the global label of a destination core node, without any IP look-up on any of the core nodes.

In an embodiment, the links 302 and 304 between the core nodes may correspond to Open System Interconnect (OSI) layer 1 (L1) or layer 2 (L2) including but not limited to time division multiplexing (TDM) circuits, optical ethernet, etc. In an embodiment, the links 302 and 304 between the core nodes may correspond to a layer 3 (L3) cloud transport including Internet. In cases of multi-hop between the core nodes, any number of tunneling technologies including but not limited to Generic Routing Encapsulation (GRE), IPSec, IPinIP, etc. with label switching over the tunnels may be utilized. In an embodiment, the link between the CPEs and core nodes i.e., CPE-Core links may correspond to point-to-point L2 connections, L3 connections, or tunnels over IP.

For secure communication of such data packets through a network, various encryption techniques defined by the IPsec standard may be implemented to encrypt the data packets. For example, one or more encryption algorithms such as, but not limited, Encapsulating Security Payload (ESP)-based encryption, Advanced Encryption Standard (AES)-based encryption, Data Encryption Standard (DES)-based encryption, and Triple-DES based encryption may be used to encrypt the data packet. In one example, the ESP protocol may be used to encrypt, encapsulate, and authenticate the data packet that is communicated between the core network 102 and the enterprise networks 104 and 106. Additionally, the encryption herein may also include one or more encapsulation techniques to encapsulate the data packet to enhance security in the data packet. For instance, the deployed encapsulation techniques may include, but not limited to, an ESP encapsulation or a generic routing encapsulation (GRE). Any of these encapsulation techniques may be used with any other encryption technique, without departing from the scope of the ongoing description.

The step-by-step process to route the data packet from one point to another using the network service architecture will be explained for unicast scenario in subsequent figures and associated description.

FIG. 4 illustrates an exemplary onboarding process of a customer enterprise for a unicast scenario in the topology of FIG. 2 in accordance with an embodiment. FIG. 4 will be described in conjunction with FIG. 1, FIG. 2, and FIG. 3, to explain the onboarding of a customer Enterprise A.

In an embodiment, the onboarding begins with deployment of a dedicated controller 202 (e.g., controller A) for the customer Enterprise A. Although controller A is depicted as a dedicated controller for enterprise A in FIG. 4, however controller A 202 may be a multi-tenant controller for multiple enterprises and may be provided with segmentation between different customers. As a non-limiting example, the multi-tenant controller may include Multiprotocol-Border Gateway Protocol (MP-BGP) for MPLS VPN network. In an embodiment, the authentication of controller A 202 may be performed based on certificates and/or configurations.

Next, an enterprise node or a CPE such as A1 204 is deployed at site 1 of Enterprise A. In an embodiment, any device such as an endpoint device in the enterprise network 104 may be the source node that transmits data packets to CPE-A1 204.

Subsequently, after deploying CPE-A1 204, a link 402, between the CPE (e.g., A1 204) of enterprise A in the enterprise network 104 and a core node (e.g., C1 208) in the SP core network 102, is established. Next, a CPE link label (CLL) LA1 for A1 204 is assigned by the core node C1 208 in the SP core network 102. The CLL is a second identifier that identifies a specific link between a CPE and a core node linked to the CPE.

After assignment of the CLL LA1, C1 208 installs an LFIB entry (in the LFIB 306 of core C1 208 as depicted in FIG. 3) for LA1 pointing to A1 204. Next, the core node C1 208 sends the global label (L1) and CPE link label (LA1) to A1 204 via the established link 402.

Thereafter, A1 204 stores locally the global label (L1) and the assigned CPE link label (LA1) received from the core node C1 208.

Figure 5:
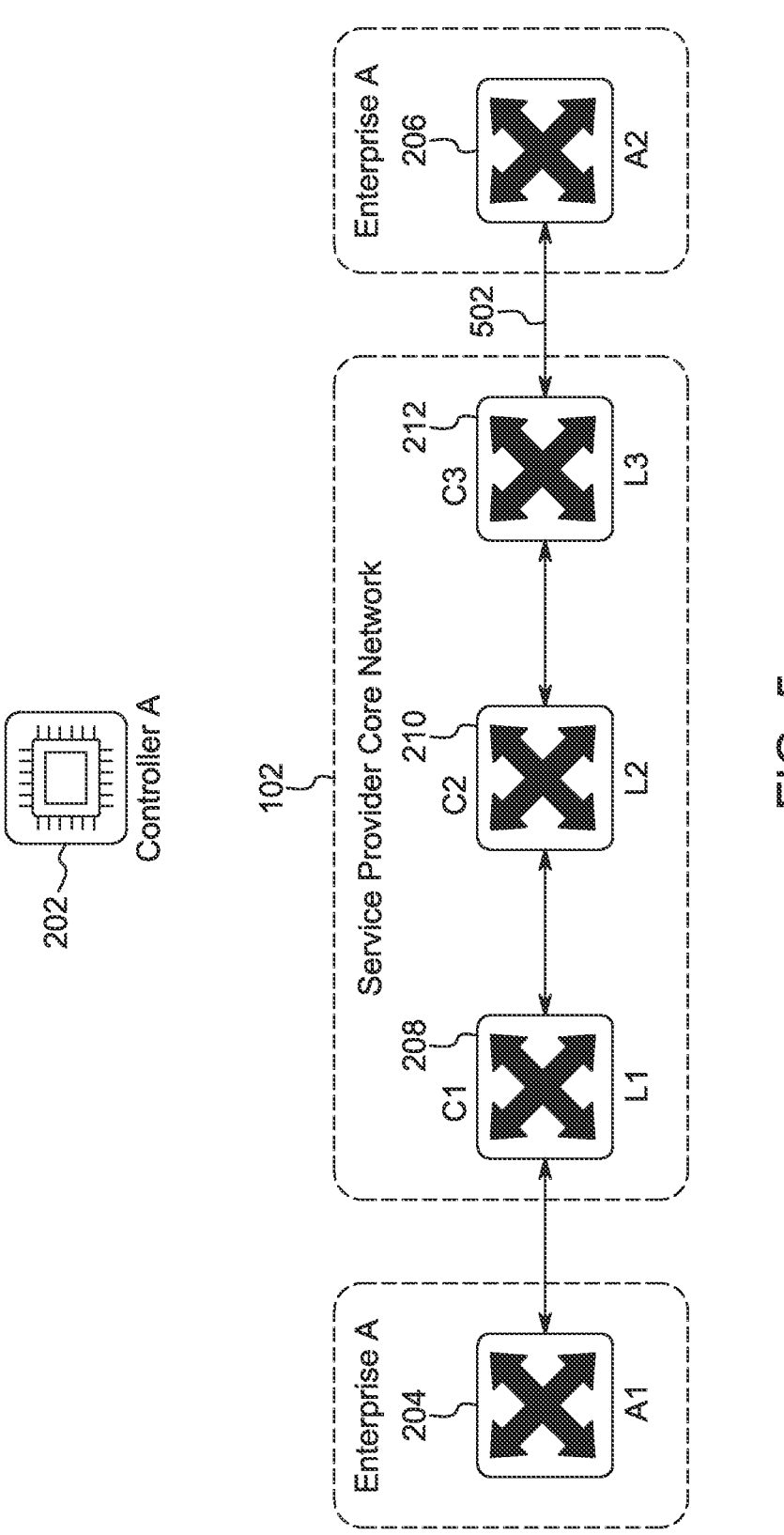
FIG. 5 illustrates setting process of an enterprise customer's second site for a unicast scenario in the topology of FIG. 2 in accordance with an embodiment.

FIG. 5 illustrates a setting process of a second customer enterprise for a unicast scenario in the topology of FIG. 2 in accordance with an embodiment. FIG. 5 will be explained in conjunction with FIG. 1, FIG. 2, FIG. 3, and FIG. 4. With reference to FIG. 5, the same onboarding process for second enterprise node CPE A2 206 is followed as in case of CPE A1 204 described in FIG. 4.

Initially, a CPE such as A2 206 is deployed at a site 2 of enterprise A for setting up a communication link 502 to the SP core network 102. Next, the communication link 502 between C3 212 and A2 206 is established. In an embodiment, authentication may be performed based on certificates and/or configuration.

Subsequently, C3 212 assigns the CPE link label (LA2) for A2 206. Next, C3 212 installs LFIB entry (in the LFIB 310 of core C3 212 as depicted in FIG. 3) for LA2 pointing to A2 206. After assignment of the CLL LA2 and installation of the LFIB entry corresponding to the CLL LA2, C3 212 sends the global label (L3) and CPE link label (LA2) to A2 206 via the established link 502. Thereafter, A2 206 stores the global label (L3) and the assigned CPE link label (LA2) received from the core node C3 212.

Figure 6:
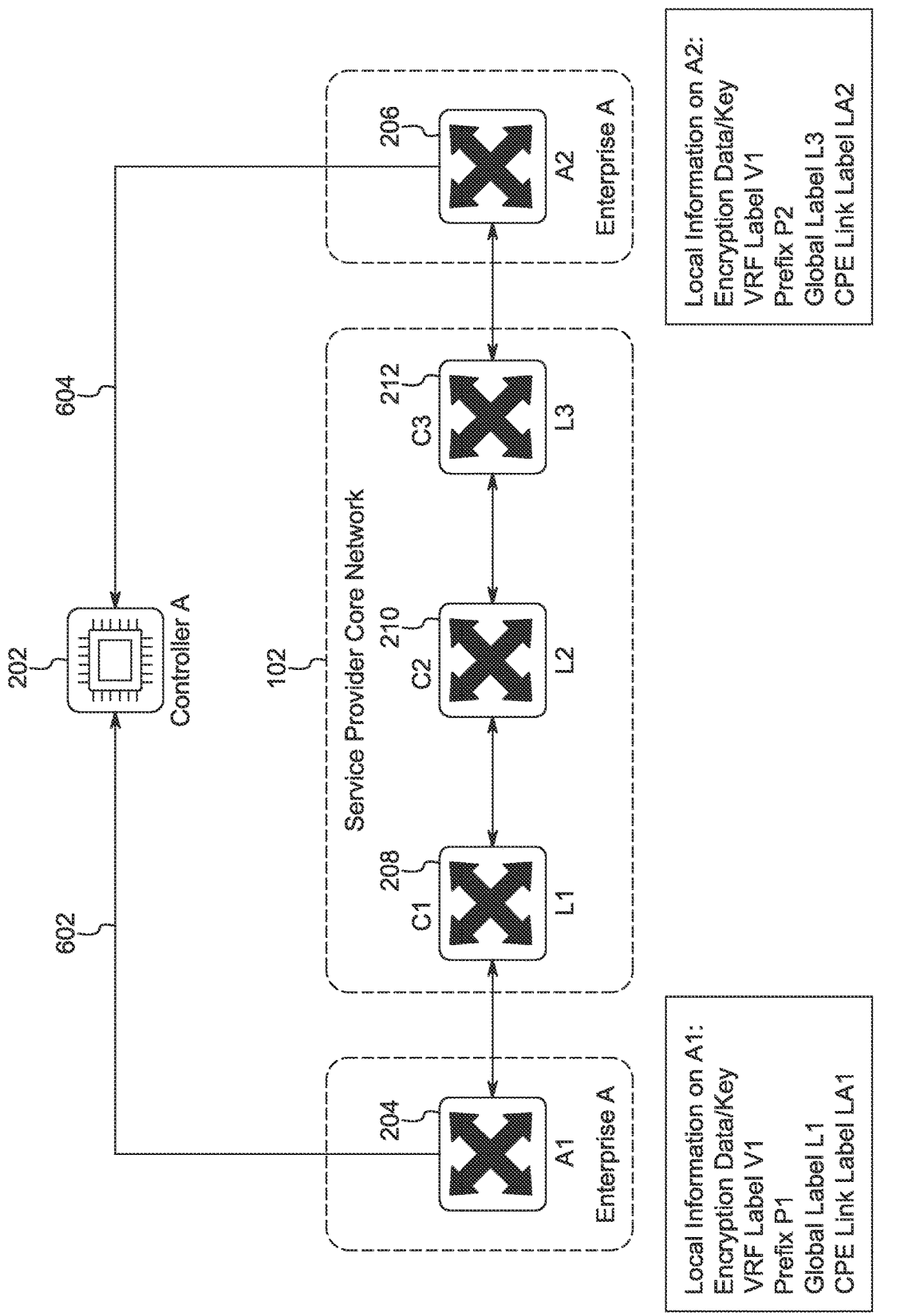
FIG. 6 illustrates routing information exchange for a unicast scenario in the topology of FIG. 2 in accordance with an embodiment.

FIG. 6 illustrates routing information exchange for a unicast scenario in the topology of FIG. 2 in accordance with an embodiment. FIG. 6 will be explained in conjunction with FIG. 1, FIG. 2, FIG. 3, FIG. 4, and FIG. 5.

With reference to FIG. 6, CPEs A1 204 and A2 206 generate VRF/VPN labels and encryption data/keys. Next, control connections are established between the CPEs and the corresponding enterprise controller. Specifically, control connection 602 is established between A1 204 and controller A 202; and control connection 604 is established between A2 206 and controller A 202. Subsequently, local information on the CPEs A1 204 and A2 206 including but not limited to encryption data/keys, VRF label, prefix, core global label, and CPE link label are sent to the controller A 202 via the established connections 602 and 604, respectively. Specifically, local information on A1 204 includes but is not limited to encryption data/key, VRF label V1, prefix P1, global label L1, and CPE link label LA1. Further, local information on A2 206 includes but is not limited to encryption data/key, VRF label V1, prefix P2, global label L3, and CPE link label LA2.

In an embodiment, CLLs have local significance to the core nodes and hence the same CLL value may be reused across different core nodes. In the example illustrated in the ongoing description, LA1 and LA2 may have the same value. In an embodiment, CLLs need not be known to any other core node or any other core controller (if present).

Figure 7:
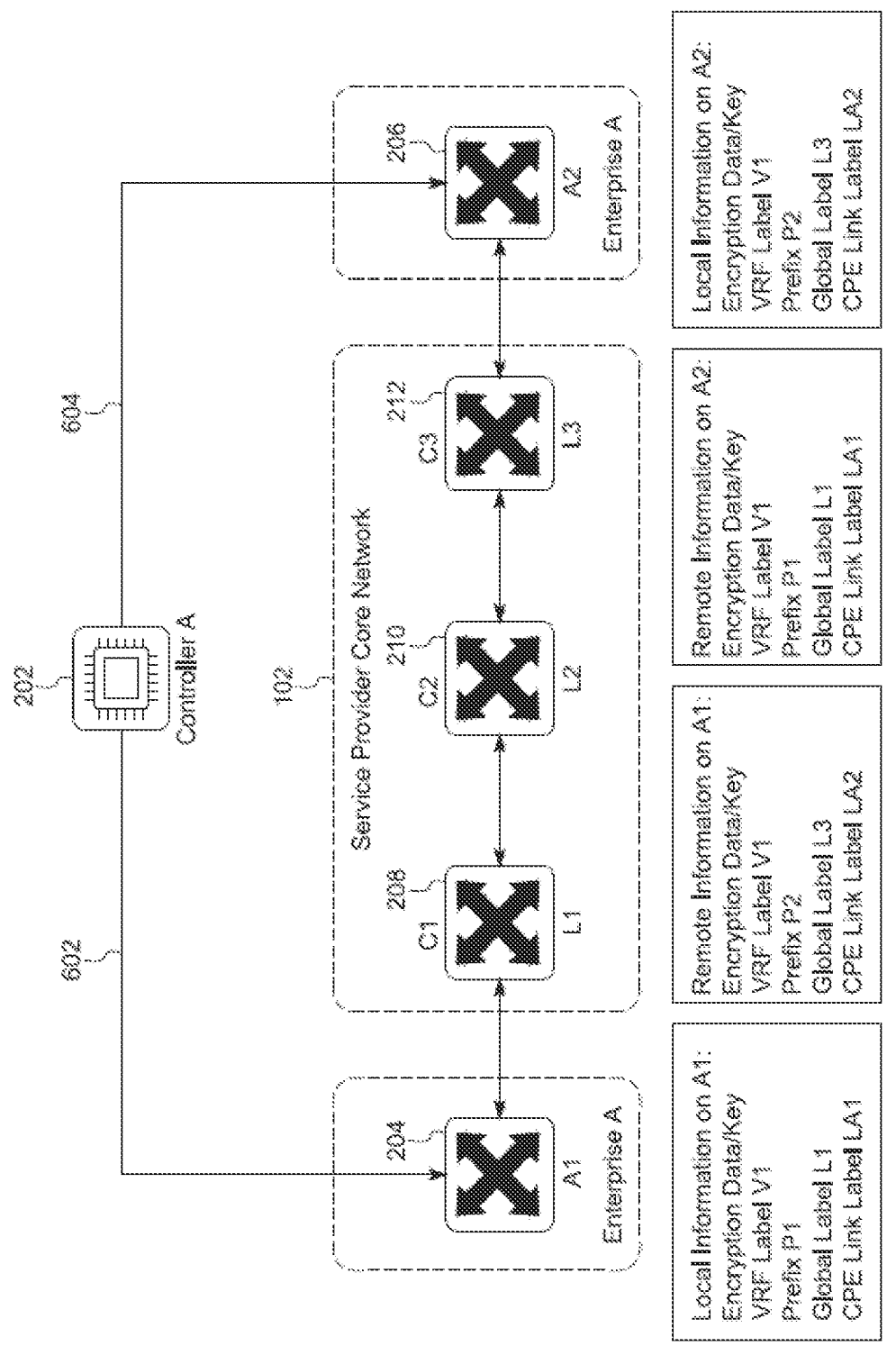
FIG. 7 illustrates additional routing information exchange for a unicast scenario in the topology of FIG. 2 in accordance with an embodiment.

FIG. 7 illustrates additional routing exchange for a unicast scenario in the topology of FIG. 2 in accordance with an embodiment. FIG. 7 will be explained in conjunction with FIG. 1, FIG. 2, FIG. 3, FIG. 4, FIG. 5, and FIG. 6.

With reference to FIG. 7, the controller A 202 distributes the local information (received from CPEs) to all other CPEs i.e., to A1 204 and A2 206. Specifically, the controller A 202 sends the local information of A2 206 to A1 204 via the established connection 602. Herein, the local information of A2 206 may include but is not limited to encryption data/key, VRF label V1, prefix P2, global label L3, and CPE link label LA2. Further, the controller A 202 sends the local information of A1 204 to A2 206 via the established connection 604, where local information of A1 204 may include but is not limited to encryption data/key, VRF label V1, prefix P1, global label L1, and CPE link label LA1. After receiving such information from the controller A 202, the respective CPE updates its VRF tables based on the received information about other remote CPEs. Therefore, as depicted in FIG. 7, local information of A2 206 is available as remote information on A1 204, and local information of A1 204 is available as remote information on A2 206.

In an embodiment, encryption data/key exchange happens between the CPEs A1 204 and A2 206 through the controller A 202. Such an exchange may include actual exchange of the encryption keys or may include exchange of some key data to generate the actual key for encryption.

In an embodiment, any type of routing and/or encryption related information exchanged between the CPEs and the controller A 202 may be facilitated by implementing MP-BGP and controller-based Internet Key exchange (IKE) mechanism. In an example, the controller A 202 may implement a controller-based Internet Key Exchange (IKE) mechanism to exchange encryption keys between CPE-A1 204 and CPE-A2 206. In this implementation, CPE-A1 204 may create a Diffie-Hellman public key and share the created Diffie-Hellman public key with the controller A 202, which may further share this public key with CPE-A2 206 (and vice versa for CPE-A2 206). CPE-A2 206 may then compute the end-to-end encryption key based on the received Diffie-Hellman public key. Thus, in this mechanism, actual encryption keys are not exchanged but key data (such as Diffie-Hellman public key) is exchanged to enable the CPEs to generate encryption keys, thereby enabling end-to-end encryption.

In some embodiments, although a centralized controller model is illustrated in the figures for control plane, other models including an in-line control plane may be implemented without departing from the scope of the ongoing description. In an embodiment, CPEs can encrypt and decrypt user data across the core network 102 and none of the core elements or nodes would have the ability to decrypt any encrypted traffic between the CPEs. The pair of global label and CPE link label i.e., first and second identifiers, acts like a next-hop in the disclosed architecture from one CPE to another CPE. Herein, the global label is used to traverse to the egress core node (such as C3 212) and the CPE link label is used to select the link on the core node leading to the egress CPE (such as A2 206). The first and second identifiers are added to overlay encapsulation performed by the ingress CPE-A1 204.

Figure 8:
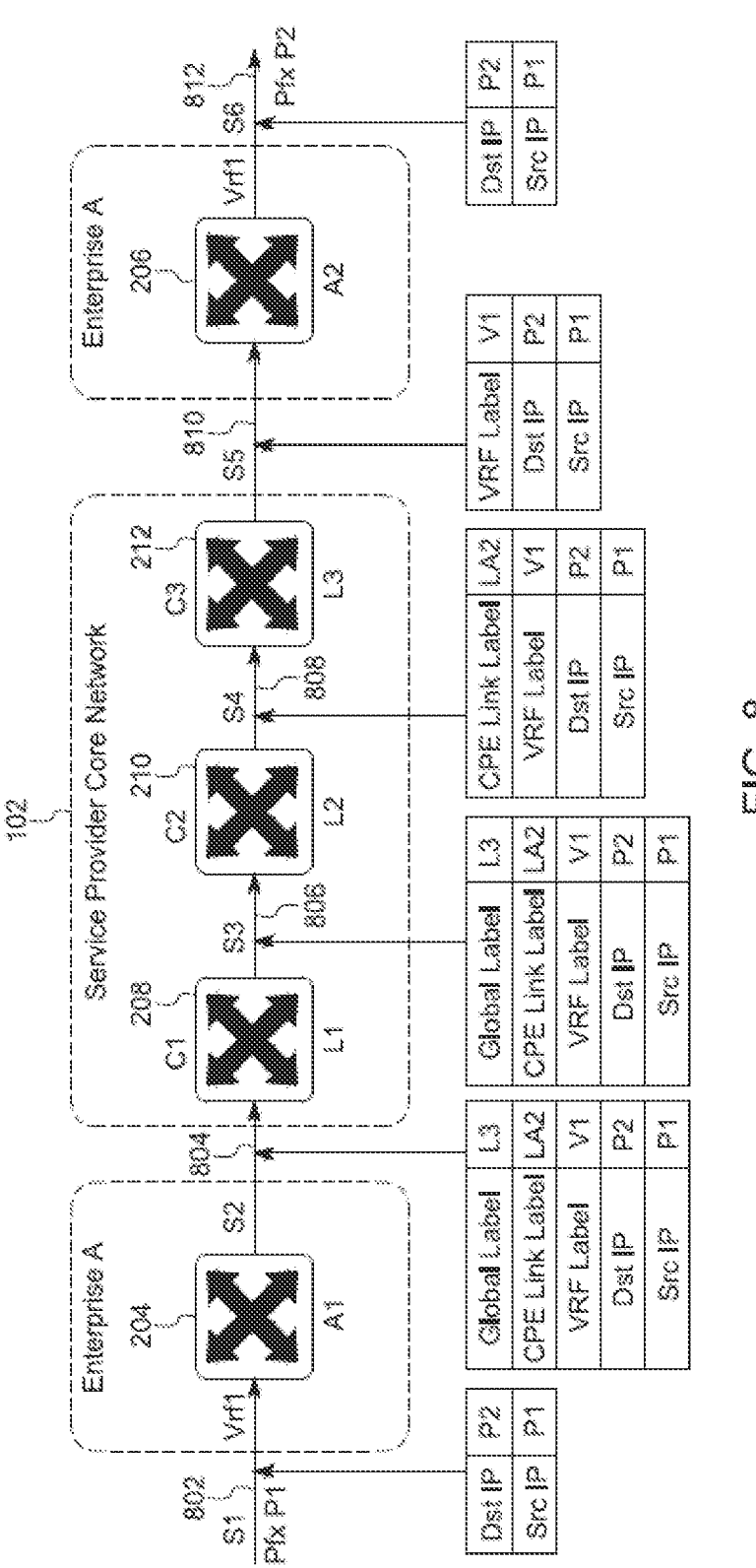
FIG. 8 illustrates an exemplary data path for a unicast scenario in the topology of FIG. 2 in accordance with an embodiment.

FIG. 8 illustrates an exemplary data path for a unicast scenario in the topology of FIG. 1 in accordance with an embodiment. FIG. 8 will be explained in conjunction with FIG. 1, FIG. 2, FIG. 3, FIG. 4, FIG. 5, FIG. 6, and FIG. 7. With reference to FIG. 8, the data path for communicating a (unicast) data packet from a source node to a destination node will be explained. For ease of understanding, the data path in FIG. 8 has been shown to indicate routing of the data packet from CPE A1 204 to CPE A2 206, where S1 to S6 depict communication channels between respective entities, such as CPEs and core nodes.

As discussed previously, label assignment for the core node may not be limited to MPLS labels such as global (core) labels and accordingly, IPv4 or IPv6 loopback/forwarding addresses may be utilized as "first identifier" for the data packets. Similarly, the label assignment for CPEs may not be limited to MPLS labels such as CPE link label and accordingly, IPv4 or IPv6 loopback/forwarding addresses on the CPEs may be utilized as "second identifier" for the data packets. However, for the sake of brevity and better understanding, label assignment using MPLS labels on the core nodes and CPEs is described in FIG. 8.

Initially, the data packet (such as an IP packet) may be originated by the source node, such as a user endpoint device, which is communicatively coupled to ingress CPE, i.e., A1 204 of enterprise A. The IP packet is to be communicated to the destination node. As depicted by 802, the IP packet is sent by the source node with a source IP address of P1 and a destination IP address of P2 and arrives at A1 204 within the VRF1 context over communication channel 51.

After receiving the IP packet by A1 204, an IP lookup is performed by A1 204. Based on a result of the IP lookup, A1 204 finds the VPN label, encryption key, global label, and CPE link label for A2 206, where A2 206 is the egress CPE associated with the destination node. After the identification of the encryption key and various labels, A1 204 encrypts the original IP packet with the encryption key of A2 206 and imposes the next-hop labels i.e., global label L3, link label LA2, and VPN label V1 to create an encrypted/encapsulated IP packet. As described in previous embodiments, global label L3 may be referred to as the "first identifier" of the encrypted/encapsulated IP packet and CPE link label LA2 may be referred to as the "second identifier" in a unicast data stream.

Subsequently, as depicted by 804, the encrypted/encapsulated IP packet is forwarded by A1 204 with the added first and second identifiers to an ingress core node i.e., C1 208, over communication channel S2.

After receiving the encrypted/encapsulated IP packet by C1 208, C1 208 does not perform any IP lookup for the customer encrypted/encapsulated IP packet. Instead, C1 208 performs the label lookup for topmost label, i.e., global label L3 in its LFIB and sends the encrypted/encapsulated IP packet as-is to an intermediate core node i.e., C2 210 over communication channel S3, as depicted by 806.

Subsequently, C2 210 receives the encrypted/encapsulated IP packet from C1 208 and performs the label lookup for topmost label L3 in its LFIB. Assuming penultimate hop popping, C2 210 pops the label L3 and forwards the encrypted/encapsulated IP packet with the topmost label LA2 to an egress core node i.e., C3 212 over communication channel S4, as depicted by 808. Therefore, the encrypted/encapsulated IP packet is forwarded by the ingress core node (C1 208) to subsequent core nodes (C2 210 and C3 212) until the encrypted/encapsulated IP packet reaches the egress core node (C3 212) based on the first identifier (L3).

After receiving the encrypted/encapsulated IP packet from C2 210 with the topmost label LA2, C3 212 performs the label lookup for LA2 in its LFIB and pops the label LA2 after determining that the next hop leads to egress CPE, i.e., A2 206, which is associated with the CPE link label LA2. Subsequently, C3 212 sends the encrypted/encapsulated IP packet to egress CPE i.e., A2 206 over communication channel S5, as depicted by 810. Therefore, the routing of encrypted/encapsulated IP packet from C3 212 to A2 206 is performed based on the second identifier (LA2).

After receiving the encrypted/encapsulated IP packet with the topmost label as VPN label V1, A2 206 pops the label and performs an IP route lookup on IP prefix P2 within VRF1 context. Further, A2 206 decrypts the encrypted/encapsulated IP packet based on data/key available with A2 206 and eventually, the plain IP packet is delivered to the destination node on the LAN side over the communication channel S6, as depicted by 812. The destination node may be communicatively coupled to A2 206.

An advantage of such a disclosed data path for communicating data packets lies in the fact that none of the core nodes are able to decrypt customer confidential data included in the data packets and only CPEs belonging to the customer are able to encrypt and decrypt the customer data, resulting in higher security and compliance than traditional methods.

Figure 9:
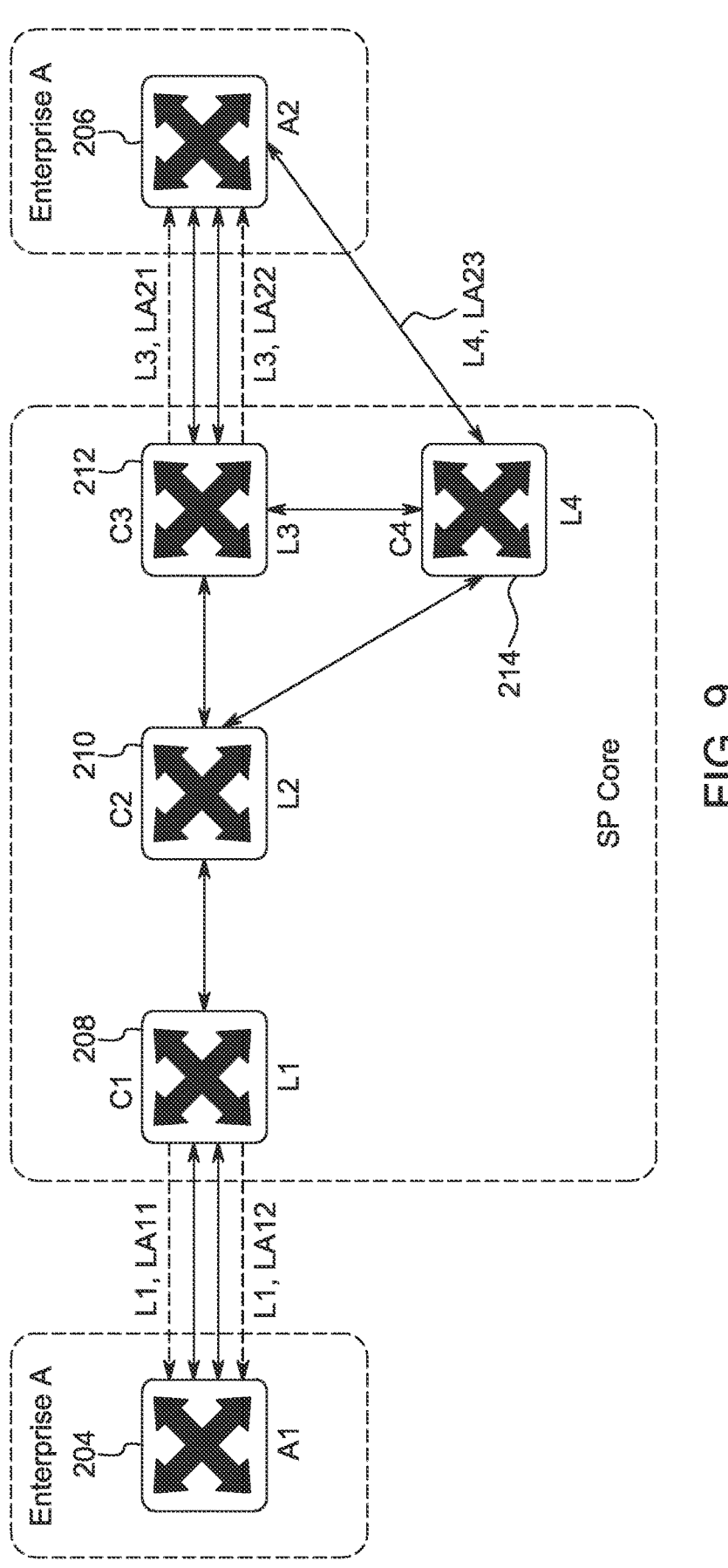
FIG. 9 illustrates multiple connections of a Customer Premises Equipment (CPE) to same core node or to multiple core nodes in accordance with an embodiment.

FIG. 9 illustrates multiple connections that a CPE may have to the same core node or to multiple core nodes in accordance with an embodiment. In an exemplary scenario, a given CPE may have multiple connections to the same core node or to multiple core nodes in the SP core as illustrated in FIG. 9. For each of the connections between a core node (such as ingress core node or egress core node) and CPE, a new CPE link label will be assigned by the respective core node.

As depicted in FIG. 9, core node C1 208 has a dual attached CPE with two links. In such a scenario, C1 208 will generate two CPE link labels i.e., one label per link. Specifically, CPE link labels LA11 and LA12 will be generated by C1 208 for CPE A1 204. After generating the two CPE link labels, C1 208 sends the global label and CPE link label pairs (L1, LA11) and (L1, LA12) to A1 204. In such a way, the remote CPE may be able to share load or select a given link for certain applications.

Further, as illustrated in FIG. 9, CPE A2 206 also has a dual connection. Specifically, A2 206 is connected to core node C3 212 as well as to another core node C4 214 with a global label assignment of L4. In this scenario, C3 212 may generate two CPE link labels corresponding to each link. In particular, C3 212 may generate CPE link labels LA21 and LA22 respectively for each link, and propagate the generated CPE link labels LA21 and LA22 to A2 206 along with the global label of C3 212 (i.e., L3). Additionally, C4 214 will generate a CPE link label for A2 206 i.e., LA23 and will propagate the generated CPE link label LA23 to A2 206 along with its global label (L4).

In the disclosed architecture and solution, the core transport network (or nodes) does not need to carry any of the enterprise specific routing information and does not need to employ any multi-tenant control plane. This is an advantage over the existing network architectures. For example, the attachment circuits, the CPE link label assignment, and the label forwarding information are local to the individual nodes of the SP core and have no direct impact on control plane scalability of the core infrastructure.

Further, in the disclosed architectures and solutions, routing and policies for the enterprise sites (such as sites 1 and 2 of enterprise A) are contained within their dedicated controller(s) and have no impact on scale of the other enterprise domains or the core infrastructures.

In addition, the IP/application data encrypted by the CPEs can only be decrypted by remote CPE for the same enterprise/tenant. The core network 102 will forward the traffic between the sites but will not have any visibility in the application data thereby maintaining data confidentiality and compliance to security norms of the enterprise(s).

Figure 10:
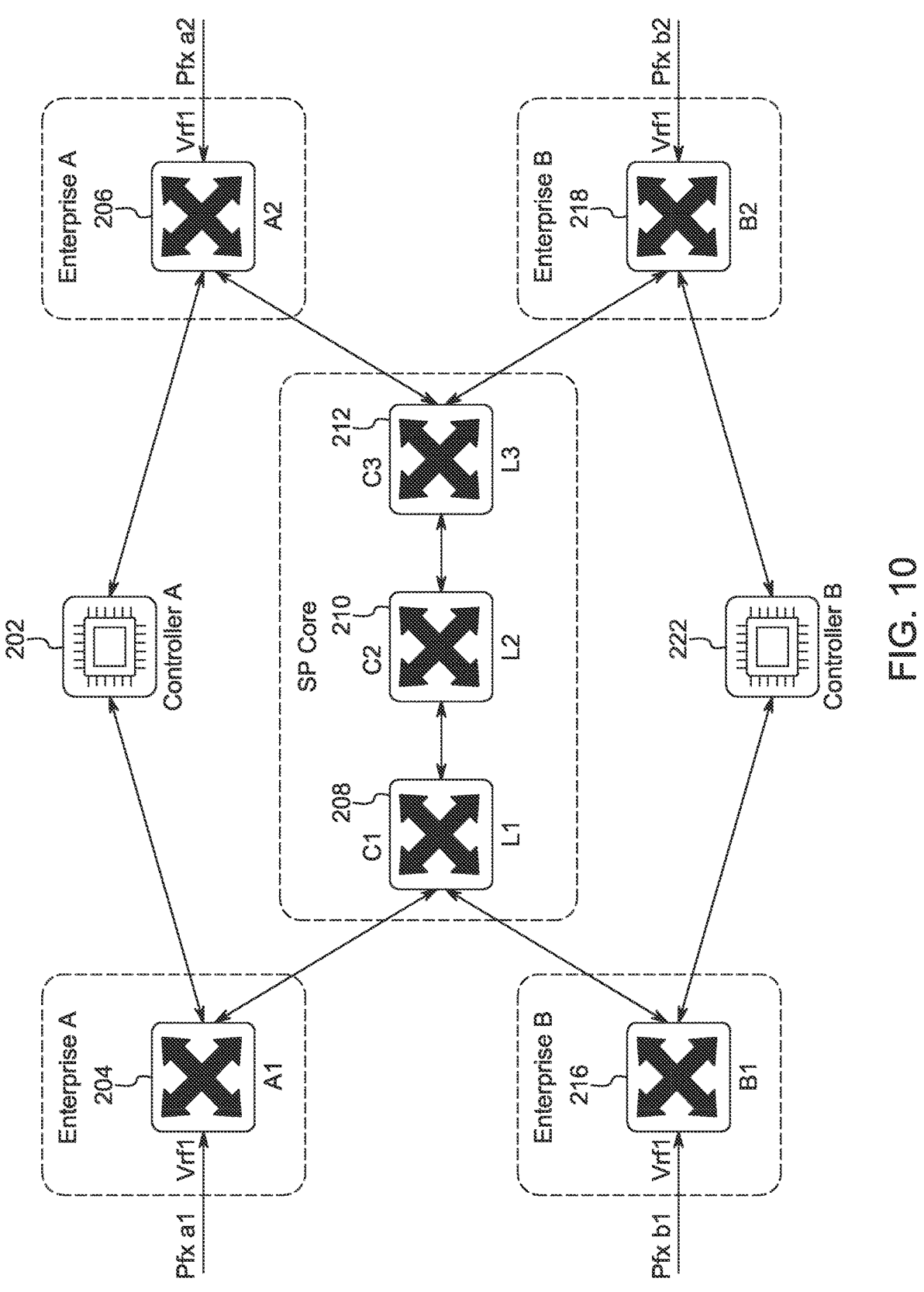
FIG. 10 illustrates an example scenario of onboarding multiple enterprises using the same core infrastructure in accordance with an embodiment.

FIG. 10 illustrates an example scenario of onboarding multiple enterprises using the same core infrastructure in accordance with an embodiment.

Multiple enterprises such as but not limited to enterprises A and B, may be onboarded using the same SP core infrastructure. In an embodiment, the enterprises A and B may be onboarded by implementing dedicated controllers per enterprise. These controllers may be two set of physical/virtual appliances to execute the desired functionality.

In a non-limiting example, as illustrated in FIG. 10, controller A 202 may be provided for enterprise A and controller B 222 may be provided for enterprise B. Specifically, (customer) application data of enterprise A may be routed between remote sites by utilizing connections between CPE A1 204 and core node C1 208 on one side and CPE A2 206 and core node C3 212 on the other side. Similarly, application data of enterprise B may be routed between remote sites by utilizing connections between CPE B1 216 and core node C1 208 on one side and CPE B2 218 and core node C3 212 on the other side. Accordingly, the scale of one enterprise does not have an impact on the scale of the other enterprise and vice versa which is an advantage over the existing architectures and solutions.

In another embodiment, instead of dedicated controllers per enterprise, a multi-tenant controller may be utilized for onboarding enterprises A and B. In such an embodiment, only one set of physical/virtual appliance may be provided with segmentation between different customers. As a non-limiting example, the multi-tenant controller may include MP-BGP for MPLS VPN network.

Further, since the customer specific routing information is not routed through the SP core and the actual IP packets are not exposed to the SP core, segmentation and confidentiality is maintained across different enterprise customers (such as enterprises A and B) as well as between the customer and SP infrastructure.

FIG. 11 illustrates a flowchart of an example method 1100 of deploying and setting up core nodes in accordance with an embodiment. As described throughout the disclosure, core global label assignment may be referred to as the "first identifier" for unicast data transmission.

The method 1100 may begin at step 1102, where a service provider may deploy core nodes for providing connectivity services to one or more customers. As described previously, any number of core nodes may be deployed depending on the load to be handled, customer sites, etc. In an embodiment, core nodes C1 208, C2 210, and C3 212 may be deployed by the service provider.

At step 1104, global labels may be assigned to each of the deployed core nodes. For example, global label L1 may be assigned to C1 208, L2 may be assigned to C2 210, and L3 may be assigned to C3 212. In an embodiment, the global label assignment of each core node may be utilized for unicast data transmission to identify an egress core node (e.g., C3 212) in the SP core 102. The global label assignment enables core nodes, such as ingress core node and intermediate nodes, to forward the data packet as-is to subsequent core node without performing any IP lookup.

At step 1106, tunnels may be established between the deployed core nodes, where needed. For example, tunnels may be established when encryption/encapsulation is required for core nodes in public infrastructure-based environment where there exists a potential threat to security of customer data included in the data packets. In an embodiment, tunnels may be established using tunneling technologies including but not limited to GRE, IPSec, and IPinIP.

Alternatively, at step 1106, a non-tunnel mode may be utilized for communication between the core nodes. For example, when the core infrastructure is privately owned and there is no potential threat to security of customer data included in the data packets then there may not be any need of encryption or encapsulation of data packets, therefore one may use the non-tunnel mode for communication. In such a scenario, a destination IP address of a remote core node may be utilized on a given core node for communication without using tunnels. It is to be noted that implementing the non-tunnel mode between the core nodes may be beneficial to save resources and costs associated with establishing the tunnels. Further, in yet another embodiment, without departing from the scope of disclosure, a combination of tunnel and non-tunnel mode may be utilized for communication between the core nodes based on the core infrastructure.

At step 1108, distributed control protocols may be run or central PCE may be utilized between the core nodes to establish label switched paths based on traffic to be routed. The label switched paths may be established between an ingress core node and an egress core node in the SP core. It will be apparent to a person with ordinary skill in the art that instead of global label assignment, IPv4/IPv6 loopback addresses on the core nodes may be utilized as identifiers without deviating from the scope of disclosure.

Therefore, the core nodes may be set up for communicating/routing customer data between enterprise sites by implementing the disclosed method 1100.

FIG. 12 illustrates a flowchart of an example method of setting up CPEs in accordance with an embodiment.

The method 1200 may begin at step 1202, where CPEs (e.g., A1, A2, A3) may be brought up for connection establishment with other entities of the network service architecture.

At step 1204, the CPEs may be authenticated and connected to the core node (e.g., C1, C2, C3). As previously discussed, FIGS. 4 and 5 pertain to establishing connection between a CPE attaching to a core node (ingress or egress).

At step 1206, after establishing the connection of the CPEs with the core node(s), the CPEs are authenticated and connected to the enterprise controller (e.g., controller A 202). In an embodiment, the enterprise controller A 202 may be a dedicated controller for an enterprise and may facilitate exchange of information between remote CPEs. The information exchanged may pertain to non-limiting examples of security/encryption key, link labels, global labels, prefixes, VPN labels, etc.

At step 1208, a CPE link label (e.g., LA1, LA2) is assigned to the respective CPE by the core node with which the CPE has established the connection. The CPE link labels are local to the core nodes and apart from the core node assigning the CPE link label, it may not be known by any other core node or any other controller if present. Since the CPE link labels have local significance unlike global labels, therefore, same value of CPE link labels may be used across different core nodes in the SP core.

At step 1210, after assignment of the respective CPE link labels by the core node, global core label and CPE link label are provided by the core node to the attached (respective) CPE. In view of the disclosed embodiments, it will be apparent to a person with ordinary skill in the art that the combination of global core label and CPE link label enables efficient routing of any type of traffic within the SP core.

Figure 13:
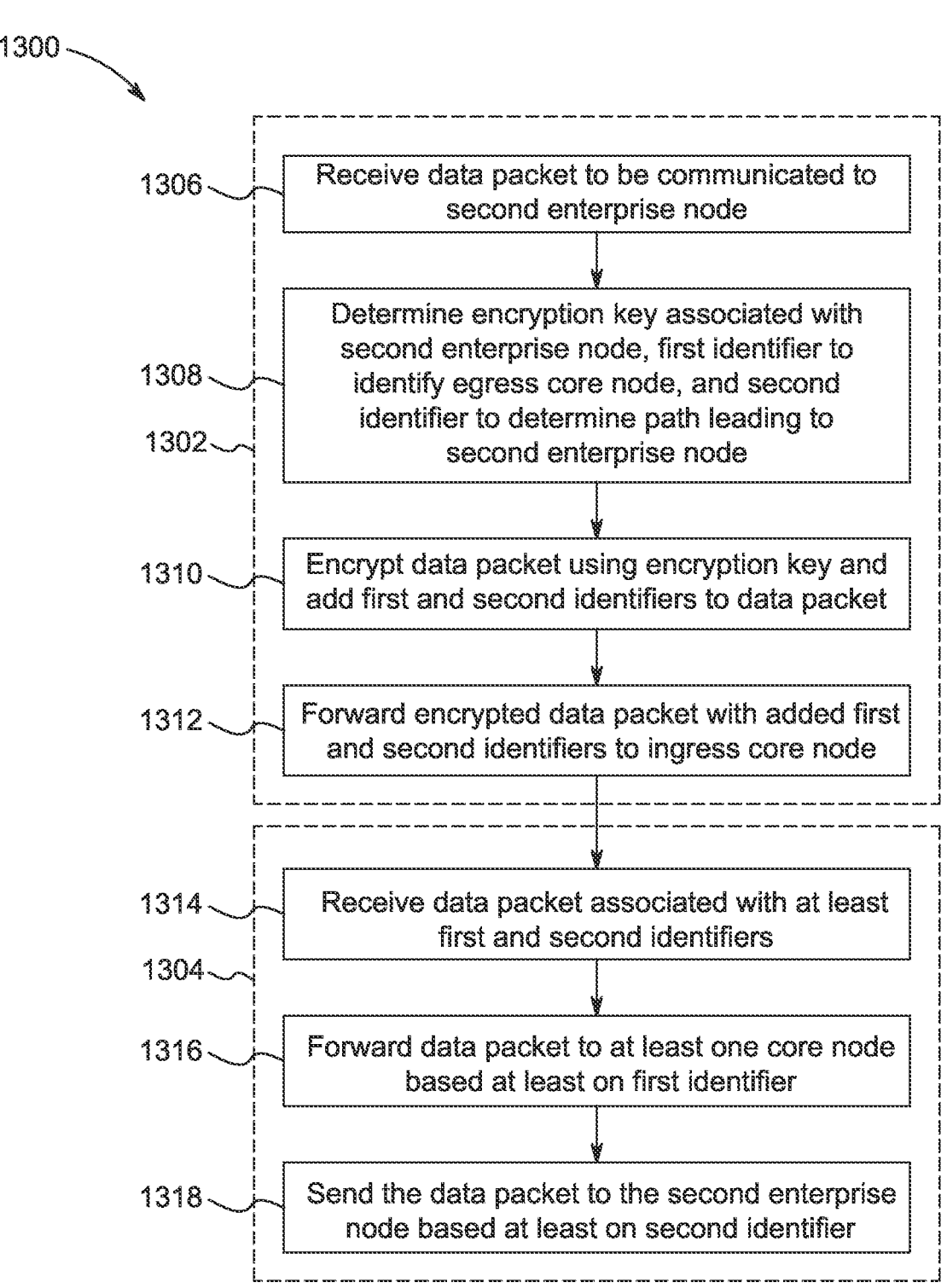
FIG. 13 illustrates a flowchart of an example method for routing data packets during unicast connectivity in accordance with an embodiment.

FIG. 13 illustrates a flowchart of an example method 1300 for routing data packets during unicast connectivity in accordance with an embodiment. With reference to all the previous figures, the method 1300 for routing or communicating a data packet, such as an IP packet, from a first enterprise node (CPE-A1 204) in an enterprise network to a second enterprise node (CPE-A2 206) in the enterprise network 106 through at least one core node in the core network 102 will be explained.

As illustrated in FIG. 13, the method 1300 includes 1302 denoting method steps executed by a first enterprise node such as CPE-A1 204 in the enterprise network; and 1304 denoting method steps that are executed by the at least one core node in the core network 102 such as C1 208, C2 210, and C3 212.

The method 1300 may begin at step 1306, where the data packet is received by the first enterprise node (e.g., CPE-A1 204) in an enterprise network of enterprise A. The data packet is destined for the second enterprise node (e.g., CPE-A2 206) in the same enterprise network of enterprise A but at geographically distant location. A source and destination of the data packet may be identified based on a source IP address and a destination IP address included in a header of the received data packet.

At step 1308, an encryption key associated with the second enterprise node (CPE-A2 206), a first identifier (e.g., global core label) to identify an egress core node (e.g., C3 212) in a core network (e.g., core network 102), and a second identifier (e.g., CPE link label) to determine a path leading to the second enterprise node (CPE-A2 206), are determined from the received data packet by the first enterprise node (CPE-A1 204). As described previously, an IP lookup is performed at the first enterprise node (CPE-A1 204) to identify the encryption key associated with the second enterprise node (CPE-A2 206), first and second identifiers, along with other labels such as but not limited to a VPN label.

In an embodiment, the first identifier associated with the data packet may include a global core label assigned to the egress core node (C3 212), such as global core label L3 assigned to egress core node C3 212, at least as previously described in FIG. 3. In an embodiment, the second identifier associated with the data packet may include CPE link label LA2 assigned to the link between the second enterprise node (CPE-A2 206) and the egress core node (C3 212), at least as previously described in FIG. 5.

At step 1310, the data packet is encrypted by the first enterprise node (CPE-A1 204) using the determined encryption key for the second enterprise node (CPE-A2 206), and the determined first and second identifiers are added to the data packet by the first enterprise node (CPE-A1 204). The determined first and second identifiers are next-hop labels imposed by the first enterprise node (CPE-A1 204).

After the processing of the data packet is completed by the first enterprise node (CPE-A1 204) in the enterprise network and the encrypted data packet is created then, at step 1312, the encrypted data packet is forwarded with the appended first and second identifiers to the ingress core node (C1 208) in the core network 102 by the first enterprise node (CPE-A1 204).

Accordingly, at step 1314, the encrypted data packet with the appended first and second identifiers is received by the ingress core node (C1 208). In an embodiment, the ingress core node (C1 208) may be a PE node that is entry point for routing and/or switching the encrypted data packet via the core network 102 in accordance with the disclosed architecture. In an embodiment, the first identifier, such as global core label L3 is used to identify the egress core node (C3 212) in the core network 102. In an embodiment, the second identifier, such as CPE link label LA2 is used to determine a path that traverses at least one core node, such as an intermediate node C2 210 and egress core node C3 212, to communicate the data packet to the second enterprise node (CPE-A2 206). In an embodiment, the ingress core node (C1 208) does not perform any IP lookup and only performs label lookup in LFIB of C1 208. Accordingly, C1 208 forwards the encrypted data packet to the next node, i.e., intermediate node C2 210. In an embodiment, the encrypted data packet is forwarded to next node by the ingress core node (C1 208) without performing any decryption of the encrypted data packet and hence, no customer data is exposed to the ingress core node (C1 208).

At step 1316, the encrypted data packet may be received by an intermediate core node (e.g., C2 210) from the ingress core node (C1 208). In an embodiment, the intermediate core node (C2 210) also performs label lookup in its LFIB based on at least the first and second identifiers. Upon determining that the next hop is the penultimate hop, the intermediate core node (C2 210) pops the global core label L3 and forwards the encrypted data packet to next node, i.e., egress core node (C3 212). Popping a label generally refers to removing the label before forwarding any data packet to subsequent node. In an embodiment, the encrypted data packet is forwarded to next node by the intermediate core node (C2 210) without performing any decryption of the encrypted data packet and hence, no customer data is exposed to the intermediate core node (C2 210).

Finally, at step 1318, the encrypted data packet received by the egress core node (C3 212) includes the second identifier or CPE link label LA2 as the topmost label. The egress core node (C3 212) performs the label lookup in its LFIB based at least on the second identifier and sends the encrypted data packet to the second enterprise node (CPE-A2 206). In an embodiment, none of the core nodes in the core network 102 decrypt the data packet, which is encrypted by a CPE. In an embodiment, the encrypted data packet may be only decrypted by a CPE. In the present example, the second enterprise node (CPE-A2 206) may decrypt the data packet encrypted by the first enterprise node (CPE-A1 204). In an embodiment, the decrypted/plain data packet may be routed to its intended destination, e.g., an endpoint device connected to the CPE-A2 206, based at least on the destination IP address included in the data packet.

In the method 1300, a pair of first and second identifiers, i.e., global core label and CPE link label acts like a next-hop in routing the data packet from one CPE to another CPE. As an advantage of the method 1300 that utilizes the disclosed architecture, only CPEs can encrypt and decrypt customer data but none of the core nodes in the core network 102 have the ability to decrypt any encrypted data packets or traffic between the CPEs. Therefore, data privacy and confidentiality are held intact for the customer data.

The disclosed methods 1100, 1200, and 1300 may be performed by processing logic that may include hardware (circuitry, dedicated logic, etc.), software (such as run on a general-purpose computer system or a dedicated machine), or a combination of both. The processing logic may be included in any node or device (e.g., core node, CPEs, controller etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer,"

"optionally," "may," and similar terms are used to indicate that an item, condition, or step being referred to is an optional (not required) feature of the invention.

The present disclosure has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the SP network architecture described herein contain optional features that can be individually or together applied to any other embodiment shown or contemplated here to be mixed and matched with the features of that architecture.

While the invention has been described with respect to a limited number of embodiments, those skilled in the art, having benefit of this disclosure, will appreciate that other embodiments can be devised which do not depart from the scope of the invention as disclosed herein.

I claim:

1. A method, comprising:

generating, by a first enterprise node of an enterprise network, first encryption key to encrypt data packets;

transmitting by the first enterprise node, the first encryption key and one or more identifiers associated with the first enterprise node to a controller via a control connection established between the first enterprise node and the controller, the one or more identifiers comprising routing information to route the data packets to a destination node via at least one core node in a core network;

after transmitting, receiving, by the first enterprise node, second encryption-data key and one or more identifiers associated with a second enterprise node of the enterprise network from the controller;

updating by the first enterprise node, a routing table of the first enterprise node based on the second encryption key and the one or more identifiers associated with the second enterprise node; and routing a data packet, of the data packets, from the first enterprise node to the second enterprise node via the at least one core node based on the updated routing table.

2. The method of claim 1, wherein each of the first and second encryption key is generated from corresponding encryption data at respective enterprise node.

3. The method of claim 2, wherein routing the data packet from the first enterprise node to the second enterprise node comprises:

encrypting, by the first enterprise node, the data packet using the encryption key associated with the second enterprise node, to generate an encrypted data packet; and adding, by the first enterprise node to the encrypted data packet, the one or more identifiers associated with the second enterprise node.

4. The method of claim 3, wherein the encrypted data packet is decrypted by the second enterprise node, to deliver the decrypted data packet to the destination node.

5. A method, comprising:

determining by the first enterprise node, based on a data packet to be communicated from a first enterprise node to a second enterprise node in an enterprise network, an encryption key associated with the second enterprise node, a first identifier to identify an egress core node in a core network, and a second identifier to determine a path leading to the second enterprise node;

encrypting, by the first enterprise node, the data packet using the determined encryption key and adding, by the first enterprise node, the determined first and second identifiers to the encrypted data packet; and forwarding, by the first enterprise node, the encrypted data packet with the added first and second identifiers to an ingress core node in the core network, wherein the ingress core node forwards the encrypted data packet to a subsequent core node until the encrypted data packet reaches the egress core node based at least on the first identifier, and wherein the egress core node sends the encrypted data packet to the second enterprise node based at least on the second identifier.

6. The method of claim 5, wherein the encrypted data packet is forwarded by a respective core node in the core network after receiving from the first enterprise node, without the respective core node performing decryption of the data packet which is encrypted by the first enterprise node.

7. The method of claim 5, wherein the first identifier comprises a global label assigned to the egress core node, and wherein the second identifier comprises a link label assigned to a link established between the second enterprise node and the egress core node.

8. The method of claim 5, wherein the first identifier comprises an Internet Protocol (IP) version 4/version 6 (IPv4/IPv6) address of the egress core node, and wherein the second identifier comprises IPv4/IPv6 address of the second enterprise node.

9. The method of claim 5, wherein the first and second identifiers are added as metadata to the data packet by the first enterprise node.

10. The method of claim 5, wherein the encryption key associated with the second enterprise node, the first identifier to identify the egress core node in the core network, and the second identifier to determine the path leading to the second enterprise node, are available as remote information on the first enterprise node before the data packet is received by the first enterprise node.

11. A customer premises equipment (CPE) in an enterprise network, the CPE comprising:

one or more processors; and memory storing computer-executable instructions that when executed, cause the one or more processors to:

determine, based on a data packet to be communicated to another CPE in the enterprise network, an encryption key associated with the another CPE, a first identifier to identify an egress core node in a core network, and a second identifier to determine a path leading to the another CPE;

encrypt the data packet using the determined encryption key and add the determined first and second identifiers to the encrypted data packet; and forward the encrypted data packet with the added first and second identifiers to an ingress core node in the core network, wherein the ingress core node forwards the encrypted data packet to a subsequent core node until the encrypted data packet reaches the egress core node based at least on the first identifier, and wherein the egress core node sends the encrypted data packet to the another CPE based at least on the second identifier.

12. The CPE of claim 11, wherein the data packet comprises a source Internet Protocol (IP) address and a destination IP address, and wherein the another CPE decrypts the encrypted data packet received from the egress core node and sends the decrypted data packet to a destination node, communicatively coupled to the another CPE, based on the destination IP address.

13. The CPE of claim 11, wherein prior to receipt of the data packet by the CPE, the computer-executable instructions further cause the one or more processors to:

receive information comprising the encryption key associated with the another CPE, the first identifier, and the second identifier from a controller via a control connection established between the CPE and the controller.

14. The CPE of claim 13, wherein to determine the encryption key, the first identifier, and the second identifier based on the data packet, the computer-executable instructions further cause the one or more processors to:

perform an Internet Protocol (IP) lookup based on the data packet and the received information from the controller; and determine the encryption key associated with the another CPE, the first identifier, and the second identifier based on a result of the IP lookup.

15. The CPE of claim 11, wherein the first and second identifiers comprise one of: Multiprotocol Label Switching (MPLS) labels and Internet Protocol version 4/version 6 (IPv4/IPv6) forwarding addresses.

16. The CPE of claim 11, wherein the encrypted data packet is forwarded by a respective core node in the core network after receipt of the encrypted data packet from the CPE, without the respective core node performing decryption of the data packet which is encrypted by the CPE.

\* \* \* \* \*